Figure 1A:
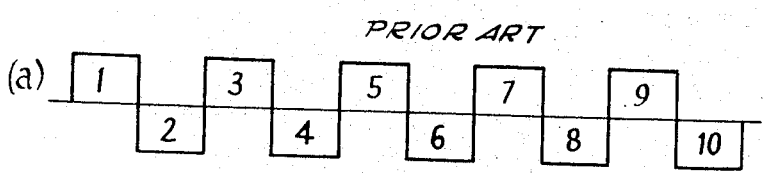

REGULAR 10-POLE

IRREGULAR 8-POLE

IRREGULAR 8-POLE

REGULAR 8-POLE

INTERMEDIATE 10-POLE

INTERMEDIATE 8-POLE

| 6 - POLES RADIANS DEGREES | | 8 - POLES DEGREES | 10 - POLES DEGREES | 12 - POLES RADIANS DEGREES | |
|---|---|---|---|---|---|
| $\frac{2\pi}{3}$ | 120 | 160 | 200 | $\frac{4\pi}{3}$ | 240 |
| $\frac{4\pi}{3}$ *  | 240 | *320 (360-40) | *400 (360+40) | $\frac{8\pi}{3}$ * | 480 |
| $\frac{8\pi}{3}$ | 480 | 640 (720-80) | 800 (720+80) | $\frac{16\pi}{3}$ | 960 |
| $\frac{10\pi}{3}$ | 600 | 800 (720+80) | 1000 (1080-80) | $\frac{20\pi}{3}$ | 1200 |
| $\frac{14\pi}{3}$ | 840 | 1,120 (1080+40) | 1,400 (1440-40) | $\frac{28\pi}{3}$ | 1680 |
| $\frac{16\pi}{3}$ | 960 | 1,280 | 1,600 | $\frac{32\pi}{3}$ | 1920 |

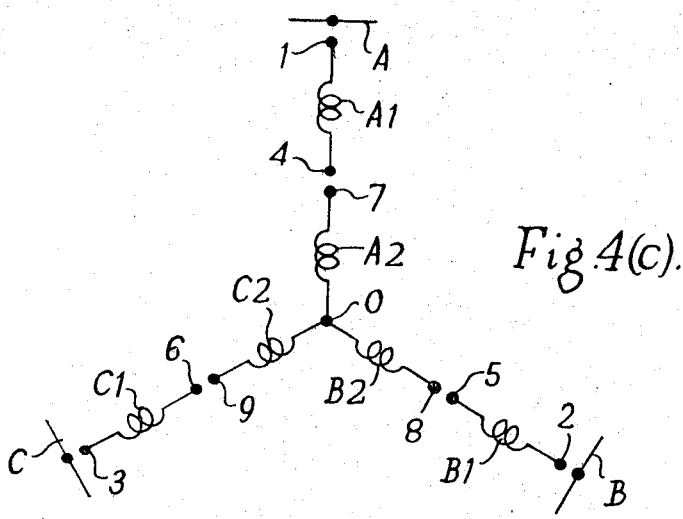
Fig.4(c).
Fig.5(a)
| 1 2 3 4 5 6 7 8 9 10 11 12 13 14 15 16 17 18 SLOT Nos.
+A +B +B +C +A +A +B +C +C +A +B +B +C +A +A +B +C +C  8-POLE, WINDING, 18-POLE MODULATING WAVE.
+A −B +B −C +A −A +B −C +C −A +B −B +C −A +A −B +C −C  10-POLE
Fig.5(b)
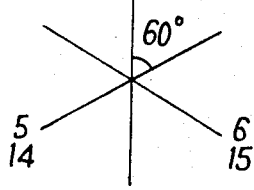
6-POLE VECTORS FOR 10-POLE WINDING
Fig.6(a)
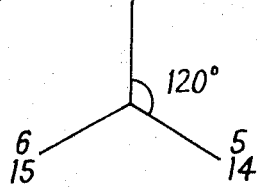
12-POLE VECTORS FOR 8-POLE WINDING
Fig.6(b)
Fig.7
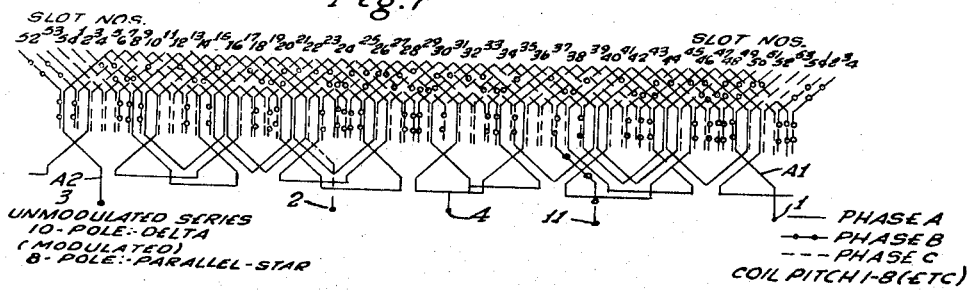
UNMODULATED SERIES
10-POLE:-DELTA
(MODULATED)
8-POLE:-PARALLEL-STAR
—— PHASE A
—•— PHASE B
--- PHASE C
COIL PITCH 1-8 (ETC)

United States Patent Office 3,450,971
Patented June 17, 1969

3,450,971
POLE-CHANGING SYNCHRONOUS ROTARY ELECTRIC MACHINES
Gordon H. Rawcliffe and William Fong, Bristol, England, assignors to National Research Development Corporation
Filed Oct. 21, 1965, Ser. No. 499,930
Claims priority, application Great Britain, Nov. 6, 1964, 45,380/64
Int. Cl. H02p *1/48, 7/48*
U.S. Cl. 318—173    13 Claims This invention relates to pole-changing, synchronous, alternating current, rotary electric machines having a pole-amplitude modulated, pole-changing alternating current armature winding and a pole-changing, direct current, salient pole, field system.

Pole-amplitude modulated, pole-changing windings are described in U.S. Patents Nos. 3,233,159, 3,175,142, 3,175,143 and 3,197,686.

When a three-phase, pole-amplitude modulated winding is used in an inductor motor, for example with a squirrel cage rotor, no problem is encountered with the triple harmonic of the operative pole-number. Although a triple harmonic M.M.F. may result from each phase-winding considered separately, the sum of the triple harmonic M.M.F.'s is zero in the three phase-windings together.

In contrast, in a synchronous machine having a direct current excited field winding, triple harmonic fields are very likely to arise.

It is known that, in principle, it is desirable to construct a D.C. excited salient-pole field system so that it provides a substantially sinusoidal flux distribution. Thus, the size and spacing of the poles, the shape of the pole-tips, the grading of air gaps and the number of direct current carrying magnetising turns are all arranged to provide as closely sinusoidal a flux distribution as is possible.

In practice, an exactly sinusoidal flux distribution is not attainable, even in a single-speed machine. In a machine providing two, or more, pole-numbers the solution is still less attainable, because the characteristics of the salient-pole system must be determined as a compromise for the alternative pole-numbers provided. In practice, therefore, it must be accepted that harmonic fluxes in addition to the fundamental flux appear for both, or all, pole-numbers of a pole-changing machine.

The object of the present invention is to provide such a synchronous machine having a pole-amplitude modulated, pole-changing, alternating current winding designed to minimize the practical effect of such harmonic flux as is produced by the direct current salient-pole field system used in the machine.

Accordingly, the present invention provides a pole-changing, synchronous, alternating current rotary electric machine having a pole-amplitude modulated, pole-changing, alternating current armature winding providing first and second alternative pole-numbers and a pole-changing, direct current, salient-pole, field system, in which the field system provides a fundamental field magnetic flux at said first and second alternative pole numbers together with harmonic flux for at least one of said first and second pole-numbers and the armature winding is of such form that the winding factor of each phase winding thereof is low with respect to E.M.F.'s generated therein by said field harmonic flux.

In any practical embodiment, it is desirable that the armature winding and the salient-pole field system be designed in combination with each other, so that the design of the armature winding is such as to inhibit currents therein due to those field-flux harmonics which, arising from the compromise of the salient-pole field system design, are to be found in the field waveform.

Conversely, if one of the alternative pole-numbers provided by the three-phase armature requires the three-phase windings to be connected together in delta, it is particularly desirable that the design of the field system is such as to reduce to the minimum triplen harmonics for the pole-number requiring the delta connection, it being remembered that triplen field flux harmonics give rise to circulating currents in a delta-connected armature winding.

Non-triplen field flux harmonics are less serious for a delta-connected armature winding, since the vector sum of E.M.F.'s due to such harmonics is zero around the closed delta-connected circuit.

For the pole-number, or pole-numbers, for which the three-phase windings of the armature are star-connected, non-triplen field flux harmonics should be reduced to the minimum. For both star- and delta-connections, the resultant E.M.F.'s of non-triplen field flux harmonics appear in the line waveform in the same proportions as they appear in the phase waveforms.

Triplen field flux harmonics are less serious when the phase-windings are star-connected and the neutral point is isolated.

The present invention thus provides, according to one aspect thereof, a pole-changing, three-phase, armature winding in which currents, due to flux-harmonics in the field of the salient-pole field system used therewith, are limited or inhibited, at both operative pole-numbers, by means discussed in detail later herein. However, it is emphasized that this forms only one aspect of the invention, the broad object of which is to provide an improved pole-changing synchronous machine.

According to this broad aspect of the invention, the problem solved in relation to the armature winding is itself reduced to its simplest form by considering the armature and field system as a combination.

Thus, in a practical case, it is to be assumed that the alternative pole-numbers required for the machine are the primary design requirements. Both the armature winding and the field system are separately subject to wide choice in design, subject to their providing the required pole-numbers and subject to their being compatible with each other.

In order that the invention may be readily carried into practical effect, the general principles thereof and practical embodiments of pole-changing armature windings according to the invention, given by way of example, will now be described in detail with reference to the accompanying drawings, of which:

FIGS. 1(*a*), 1(*b*), FIGS. 2(*a*), 2(*b*), and FIGS. 3(*a*), 3(*b*), show three pairs of different waveforms for a 10-pole/8-pole salient pole field system; FIG. 4 is a table showing the possible winding spacings in accordance with the invention.

FIGS. 4(*a*) and 4(*b*), are diagrams of a three-phase armature winding having phase-winding parts connected alternatively in series-delta and parallel-star, respectively; and FIG. 4(*c*) is a diagram of a three-phase armature winding having phase winding parts adapted for connection together either in series-star or in parallel-star arrangements;

FIGS. 5(*a*) and 5(*b*) are slot diagrams of an 8-pole fractional-slot winding wound in an 18-slot armature frame, showing at 5(*a*) the unmodulated phase-band arrangement with superimposed 18-cycle overall modulation wave and showing at 5(*b*) the resultant phase-band arrangement providing a 10-pole, three-phase M.M.F.; and FIGS. 6(a) and 6(b) show respectively, vector star diagrams for 6-pole E.M.F.'s in relation to phase A of the 10-pole connection and for 12-pole E.M.F.'s in relation to phase A of the 8-pole connection of the armature winding of FIG. 5 and FIG. 7 shows a PAM pole changing winding.

It is assumed, for the purpose of this explanation, that a 10-pole/8-pole, three-phase, synchronous machine is required.

From the general explanation of pole-amplitude modulation, given for example in U.S. Patent No. 3,233,159 and by reason of the fact that the required alternative pole-numbers differ by one pole-pair, it is known that all suitable armature windings, giving the alternative pole-numbers 10-poles and 8-poles, will have a single cycle modulation wave applied to each phase-winding. That is, each phase-winding will comprise two groups of coils, one group of which will be reversed in circuit for the modulated pole-number.

Among a wide choice of pole-amplitude modulated windings providing either 8-poles or 10-poles is the winding shown in FIG. 23 of U.S. Patent No. 3,233,159, which gives 10-poles in the unmodulated connection and 8-poles in the modulated connection.

For all the windings referred to in the preceding paragraph, one pole-number requires the parallel-star connection of the phase-winding parts. The other pole-number requires the series-star connection of the phase-windings in some cases and the series-delta connection in other cases.

Thus, depending upon whether a particular pole-number requires a star-connection or a delta-connection, it will be known, from the earlier discussion herein, whether triplen field flux harmonics or whether non-triplen field flux harmonics are the more important at that particular pole-number. Obviously, if both pole-numbers use a star-connection (series-star/parallel-star), triplen field flux harmonics are relatively unimportant for both pole-numbers.

Consider next FIGS. 1(a), 1(b), FIGS. 2(a), 2(b), and FIGS. 3(a), 3(b) of the accompanying drawings.

Figure 1B:
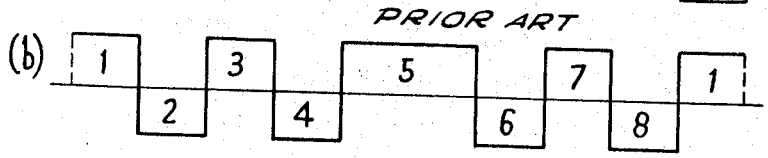

FIGS. 1(a) and 1(b) show, respectively, wave diagrams of a previously-known field arrangement providing a regular 10-pole distribution and an irregular 8-pole distribution with a large harmonic content.

Figure 2A:
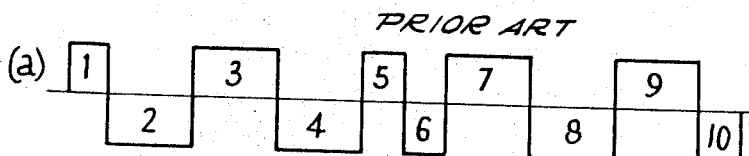
Figure 2B:
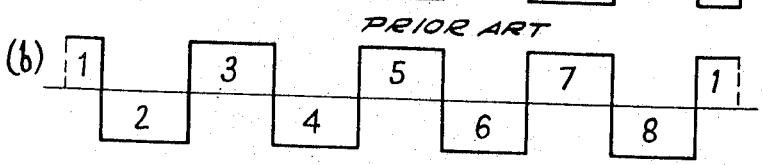

FIGS. 2(a) and 2(b) show, respectively, wave diagrams of a previously-known field arrangement providing an irregular 10-pole distribution, with a large harmonic content, and a regular 8-pole field.

Figure 3A:
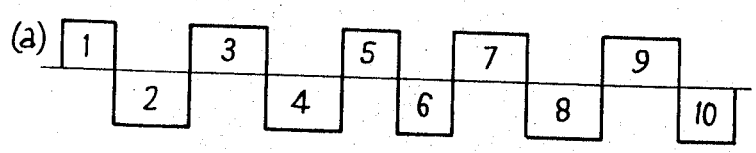
Figure 3B:
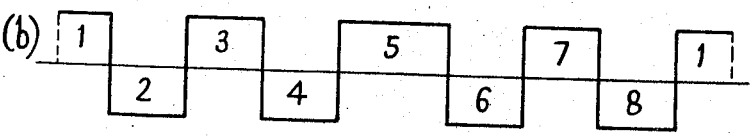
Figures 4, 4A, 4B:
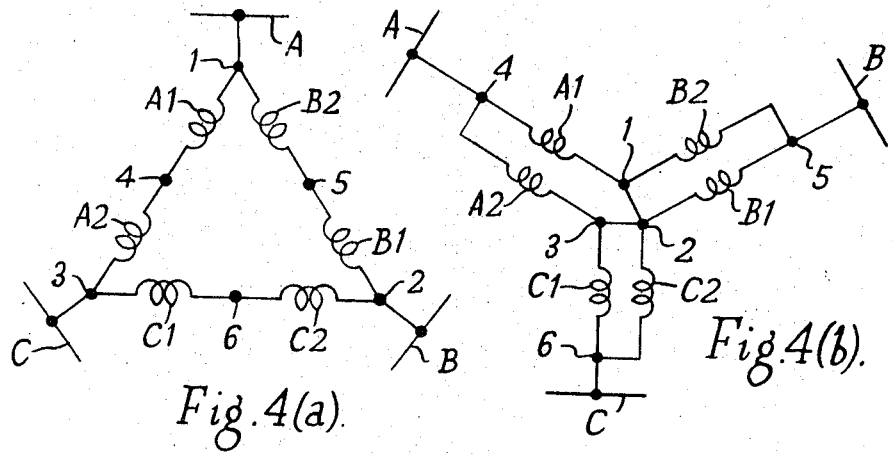

FIGS. 3(a) and 3(b) show, respectively, wave diagrams of an arrangement providing graded distribution for both pole-numbers, thereby reducing the harmonic content at one pole-number at the expense of introducing some harmonics at the other pole-number.

The field system of FIGS. 3(a), 3(b) has ten polar projections. When these are energised with alternate polarity, as shown in FIG. 3(a), the resultant waveform is predominantly a 10-pole waveform and includes, by theory, all odd numbers of pole-pairs. In practice, the largest in magnitude of these parasitic components is the 6-pole component.

When the polar projections are energised for 8-poles, as shown in FIG. 3(b), by reversal of half the D.C. energising winding, which reverses in polarity the poles numbered 6 to 10 in FIG. 3(a), the resultant waveform is predominantly an 8-pole waveform and includes, by theory, all even numbers of pole-pairs. In practice, the largest in magnitude of these parasitic components is the 12-pole component.

It is thus required, according to this example, that a 10-pole/8-pole armature winding according to the present invention shall have low winding factors for a 6-pole field, for 10-pole working, and for a 12-pole field, for 8-pole working.

Four means may be used, either singly or in combination to achieve a satisfactory armature winding, as follows:

(1) The first method comprises grouping the coils of the chosen form of pole-amplitude modulated winding so that the winding factor of each phase separately is small or zero with respect to the undesired field flux harmonics.

(2) The second method comprises forming the three-phase winding as a combination of two or more component sections and using section-chording, that is second chording, in the combination of the several sections, so that the resultant induced E.M.F., due to the undesired field flux harmonics, is zero for the composite winding. The winding factor of each section alone need not be zero with respect to the flux harmonics, but all the sections combined in series must have zero winding factor to the flux harmonics.

(3) The third method applies where other design considerations permit and comprises the particular choice of coil-pitch throughout the armature winding to minimise induced E.M.F. due to the undesired field flux harmonics.

(4) The fourth method applies when the armature winding normally uses delta connection of the phase-windings for a pole-number at which, in the field system, triplen field-flux harmonics cannot be avoided, and comprises using, as an alternative, solely star-connection of the phase-windings for both pole-numbers. The connections for the alternative pole-numbers are then either series-star/series-star-reversed or parallel-star/parallel-star-reversed. This expedient requires the provision of nine lead-out connections instead of six.

Harmonic E.M.F.'s which are eliminated between phase lines only, by use of star-connections, will still appear, as before, between line and star point.

This fact may be of importance in the case of a synchronous generator where the star point is connected to a neutral line.

The fourth method above will be first considered in greater detail because, although it applies only to armature windings normally using delta-connection for one pole-number, its use may determine the design of the salient pole field system, by reason of the consequent unimportance of triplen field flux harmonics.

There is shown in FIGS. 4(a) and 4(b) alternative series-delta and parallel-star connection of a three-phase winding comprising three-phase windings each of two parts A.1, A.2; B.1, B.2 and C.1, C.2. The three-phase winding has six terminals for external connections, numbered 1 to 6 in the figures.

In the series-delta connection of FIG. 4(a), terminals 1, 2 and 3, respectively, are supplied from the phase lines A, B and C.

In the parallel-star connection of FIG. 4(b), terminals 1, 2 and 3 are connected together, forming a star point, and terminals 4, 5 and 6, respectively, are supplied from phase lines A, B and C.

It will be noted that phase-winding parts A.1, A.2, and A.3 are reversed in current carrying sense by the alternative connections and that these alternative connections are such as are normally required for the pole-amplitude modulated winding of FIG. 23 of U.S. Patent No. 3,233,159 for example, to provide the alternative pole-numbers.

There is shown in FIG. 4(c) a rearrangement of the phase-winding parts of the three-phase winding of FIGS. 4(a) and 4(b) between nine connecting terminals numbered 1 to 9 in the figure. A permanent star point 0 is made by connecting together ends of the phase-winding parts A.2, B.2 and C.2. There are shown, by the following lists of connections, alternative series-star/series-star-reversed and parallel-star/parallel-star-reversed connections which have the same effect as the alternative connections of FIGS. 4(a) and 4(b) in reversing in current carrying sense the phase-winding parts A.1, B.1 and C.1.

*Series-star*

Join terminals: 4–7, 5–8, 6–9.
Supply from:
    Line A to terminal 1.
    Line B to terminal 2.
    Line C to terminal 3.

*Series-star-reversed*

Join terminals: 1–7, 2–8, 3–9.
Supply from:
    Line A to terminal 4.
    Line B to terminal 5.
    Line C to terminal 6.

*Parallel-star*

Join terminals: 4–5–6.
Join terminals: 1–7, 2–8, 3–9.
Supply from:
    Line A to terminals 1, 7.
    Line B to terminals 2, 8.
    Line C to terminals 3, 9.

*Parallel-star-reversed*

Join terminals: 1–2–3.
Join terminals: 4–7, 5–8, 6–9.
Supply from:
    Line A to terminals 4, 7.
    Line B to terminals 5, 8.
    Line C to terminals 6, 9.

Considering now in greater detail, the first method referred to above, the basis of this method is to choose a basic pole-amplitude modulated winding for the required alternative pole-numbers using an armature frame with the smallest number of slots practicable and having a high winding factor for both the alternative pole-numbers, as fundamental field in each case, and zero winding factor for the predominant residual field flux harmonic at each pole-number.

Taking, as example, the requirements for an 8-pole/10-pole synchronous machine, a three-phase, fractional-slot, armature winding, providing 8-poles in the unmodulated connection, can be arranged as shown in FIG. 5(a).

In FIG. 5, the top line of figures shows the armature slots consecutively numbered 1 to 18. Below, at (a), are the phase-bands corresponding to each slot. In the figure, the phase-bands do not correspond to the normal sequence $+A-B+C-A+B-C$, and the signs used do not refer to the normal phase-band polarity, but refer to an arbitrary sense of current flow in the coils wherein "+" is the normal sense, for unmodulated connected and "−" indicates a reversal in circuit for the modulated connection.

The unmodulated connection of FIG. 5(a) is a 120° spread 8-pole winding with coils grouped in phase-bands: $+1+2+1+2$ for each phase.

Thus, FIG. 5(a) shows, extending around the phase-band references, an 18-cycle overall modulating wave to provide 10-poles in the modulated connection of the winding. FIG. 5(b) shows the sense of current flow in the phase-bands for the 10-pole modulated connection, relative to the sense of current flow for the unmodulated connection of FIG. 5(a).

The number of slots for the armature frame of the final form of the armature winding will always be a multiple of the slot-number of the basic winding, in this example 18 slots, as will appear from the further explanation.

Considering, in relation to this armature winding, the salient-pole field system described herein with reference to FIGS. 3(a) and 3(b), it will be remembered that the major unwanted field flux harmonic is 6-poles, for the 10-pole connection and 12-poles for the 8-pole connection.

With the 18-slot frame chosen, the angle between successive slots for 6-poles is 60° and for 12-poles is 120°.

The vector diagram for phase A of the 10-pole winding of FIG. 5(b), with respect to the 6-pole field, is shown in FIG. 6(a). The vector diagram for phase A of the 8-pole winding of FIG. 5(a), with respect to the 12-pole field, is shown in FIG. 6(b). The vector diagrams for phases B and C are identical to those of FIGS. 6(a), 6(b), but relatively angularly displaced.

It will be evident, from inspection of these vector diagrams, that for both pole-numbers, the vector sum for the harmonic E.M.F. is zero and, further, the vector sum for each half phase-winding is zero.

In this case, therefore, it is possible to use parallel connection of the phase-winding halves for either, or both, pole-numbers.

This being so, it is preferred, to use the parallel connection for 8-pole working.

Such a "basic" pole-amplitude modulated winding permits of the use of section-chording, by, for example, the combination of four such sections each in 18-slots to provide an 8-pole/10-pole winding in a 72-slot frame.

The composite winding is completely symmetrical for all three phases. Each 18-slot component has zero winding factor with respect to the principal field flux harmonic present at each working pole-number. Thus, the interleaving of the component windings in the 72-slot frame can, in this example, follow design requirements quite independently of the consideration of the principal field flux harmonics present.

Considering, now in greater detail, the second method referred to above, the use of this method results from the necessary choice of a "basic" pole-amplitude modulated winding, providing the required alternative pole-numbers, which has not a low winding factor for the principal field flux harmonic pole-numbers.

For example, an 8-pole/10-pole, pole amplitude modulated winding in 24 slots, having coils grouped into phase-bands $$1-2-1-0—1-2-1-0$$

for each phase-winding, has a high winding factor for the principal field flux harmonics present, considering again the salient-pole system of FIGS. 3(a) and 3(b).

However, if three such component windings are combined in a 72-slot armature frame, spaced apart so that a coil of each component winding occupies every third slot, a large number of alternative spacings can be used.

With respect to the 10-pole field flux harmonics, present for the 10-pole connection of the field systems, all spacings of the component windings are given by the expression:

$$2n\pi/3$$

when $n$ is any integer not a multiple of "3."

With respect to the 12-pole field flux harmonic, present for the 8-pole connection of the field system, all spacings $$4n\pi/3$$

ings of the component windings are given by the expression:

where $n$ is any integer not a multiple of "3."

If the three component windings are connected in series, phase by phase, the resultant winding factor with respect to 6-poles and 12-poles is necessarily zero for, whatever the resultant E.M.F. values for each 24-slot component winding separately, the sum of three E.M.F.'s spaced apart by $2n\pi/3$, or $4n\pi/3$, is necessarily zero.

As a further design requirement, it is desirable that the spacing of the three component windings shall be approximately 360°, or a multiple thereof, with respect to 8-poles and to 10-poles.

Table I, forming a part of the accompanying drawings, shows the possible spacings which satisfy both requirements. The maximum value of the 6-pole displacement which it is necessary to consider is $16\pi/3$. Thereafter, the sequence of displacements repeat earlier values given in the table.

Furthermore, the displacement of $A\pi/3$ in relation to 6-poles is identical to the displacement of $14\pi/3$, since the one angle in one sense of rotation about the winding axis is the same as the other angle in the opposite sense of rotation.

From the table, it is thus seen that the preferred spacing of the three 24-slot sections is $4\pi/3$ in relation to 6-poles and so on, the series of figures being starred in Table I. This represents the spacing apart of corresponding parts of the three component windings by 16-slots in the 72-slot frame.

It can be shown that the factor by which the layer factor of the 24-slot component winding is reduced is:

$$\frac{1+2\cos 40°}{3} = 0.844$$

By use of the techniques disclosed herein, pole-amplitude modulated, three-phase armature windings may be designed, which provide alternative pole-numbers and are satisfactory in operation in respect of induced E.M.F.'s due to the principal field flux harmonics of the corresponding salient-pole field system.

In practice, the winding factor of the composite winding may be some 5% to 8% lower than that of the component armature winding which could have been used otherwise, for example for an induction machine.

What we claim is:

1. A pole-changing, synchronous, alternating current rotary electric machine having a pole-amplitude modulated, pole-changing, alternating current armature winding providing, first and second alternative pole-numbers and a pole-changing, direct current, salient-pole, field system, in which the field system provides a fundamental field magnetic flux at said first and second alternative pole numbers together with harmonic flux for at least one of said first and second pole-numbers and the armature winding is of such form that the winding factor of each phase winding thereof is low with respect to E.M.F.'s generated therein by said field harmonic flux.

2. A pole-changing synchronous rotary electric machine as claimed in claim 1, having a three-phase alternating current armature winding providing one of said first and second pole-numbers with delta connection of the three phase-windings thereof, in which the field system is designed to have low triplen harmonic flux for the said pole-number corresponding to delta connection of the armature winding.

3. A pole-changing synchronous rotary electric machine as claimed in claim 1, having a three-phase alternating current armature winding providing one of said first and second pole-numbers with star connection of the three phase-windings thereof, in which the field system is designed to have low non-triplen harmonic flux for the said pole-number corresponding to star connection of the armature winding.

4. A pole-changing synchronous rotary electric machine as claimed in claim 1, in which the armature winding is a three-phase, pole-amplitude modulation pole-changing winding.

5. A pole-changing synchronous rotary electric machine as claimed in claim 4, in which the armature winding is a three-phase, pole-changing winding providing alternative pole-numbers in close-ratio, less than 2:1.

6. A pole-changing synchronous rotary electric machine as claimed in claim 5, in which the low winding factor of the three-phase armature winding is achieved by use of at least one of the following expendients:

(i) Use of a coil group distribution such that each phase-winding, considered above, has a low or zero winding factor with respect to the undesired field flux harmonics;

(ii) Use of two or more component section windings, spaced apart around the stator, that is using "section" or "second" chording, such that the resultant induced E.M.F. due to the undesired flux harmonics is substantially zero for the composite winding;

(iii) Use of a coil-pitch throughout the winding, that is using "first chording," such that the E.M.F. due to the undesired flux harmonics is minimised; and (iv) Use of a solely star-connected armature winding switched for alternative pole-numbers according to one of the combinations;

series-star/series-star-reversed
parallel-star/parallel-star-reversed.

7. A pole-changing, synchronous, three-phase, alternating current rotary electric machine having a pole-amplitude modulated, pole-changing, three-phase armature winding having three phase-windings with winding parts selectively connected together for providing first and second alternative numbers of poles, and a pole-changing, direct current, salient pole field system for providing said first and second numbers of poles, said armature winding having the phase-windings thereof connected together in delta for said first pole-number, said field system including a direct current field winding providing said first and second numbers of poles by reversal of current flow in one part of the field winding relatively to the direction of current flow in another part of the field winding, the pole-widths of the poles developed varying from one to another for both the first and the second numbers of poles, the rates between any two successive poles for both the first and the second numbers of poles being always less than 2:1, said rates being selected so that triplen harmonics of said first number of poles are low.

8. A pole-changing, synchronous, three-phase alternating current rotary electric machine having a pole-amplitude modulated, pole-changing, three-phase armature winding having three phase-windings with winding parts selectively connected together for providing first and second alternative numbers of poles and a pole-changing, direct current, salient pole field system including a direct current field winding providing said first and second numbers of poles by reversal of current flow in one part of the field winding relatively to the direction of current flow in another part of the field winding, and including salient poles having widths varying from one to another for both the first and the second numbers of poles, the ratio between any two successive poles for both the first and the second numbers of poles being always less than 2:1, said salient poles having varying widths defining, for both said first and second numbers of poles, a MMF waveform having a fundamental number of poles corresponding thereto and, for at least said first number of poles, a harmonic number of poles, each said phase-winding of said armature winding having a low winding factor with respect to EMF's generated therein by field flux of said harmonic number of poles.

9. A pole-changing, synchronous, three-phase alternating current rotary electric machine having a pole-amplitude modulated, pole-changing, three-phase armature winding having three phase-windings with winding parts selectively connected together for providing first and second alternative numbers of poles and a pole-changing, direct current, salient pole field system including a direct current field winding providing said first and second numbers of poles by reversal of current flow in one part of the field winding relatively to the direction of current flow in another part of the field winding, and including salient poles having widths varying from one to another for both the first and the second numbers of poles, the ratio between any two successive poles for both the first and the second numbers of poles being always less than 2:1, said salient poles having varying widths defining, for both said first and said second numbers of poles, a MMF waveform having a fundamental number of poles corresponding thereto and, for at least said first number of poles, a harmonic number of poles, each said phase-winding of said armature winding comprising coils grouped so that the winding factor of each said phase is small with respect to field flux of said harmonic number of poles.

10. A pole-changing, synchronous, three-phase alternating current rotary electric machine having a pole-amplitude modulated, pole-changing, three-phase armature winding have three phase-windings with winding parts selectively connected together for providing first and second alternative numbers of poles and a pole changing, direct current, salient pole field system including a direct current, salient pole field system including a direct current field winding providing said first and second numbers of poles by reversal of current flow in one part of the field winding relatively to the direction of current flow in another part of the field winding, and including salient poles having widths varying from one to another for both the first and the second numbers of poles, the ratio between any two successive poles for both the first and the second numbers of poles being always less than 2:1, said salient poles having varying widths defining, for both said first and said second numbers of poles, a MMF waveform having a fundamental number of poles corresponding thereto and, for at least said first number of poles, a harmonic number of poles, said armature winding comprising a combination of at least two component sections chorded so that the resultant induced EMF, due to field flux of said harmonic number of poles is small for said composite winding.

11. A pole-changing, synchronous, three-phase alternating current rotary electric machine having a pole-amplitude modulated, pole-changing, three-phase armature winding having three phase-windings with winding parts selectively connected together for providing first and second alternative numbers of poles and a pole-changing, direct current, salient pole field system including a direct current field winding providing said first and second numbers of poles by reversal of current flow in one part of the field winding relatively to the direction of current flow in another part of the field winding, and including salient poles having widths varying from one to another for both the first and the second numbers of poles, the ratio between any two successive poles for both the first and the second numbers of poles being always less than 2:1, said salient poles having varying widths defining, for both said first and second numbers of poles, a MMF waveform having a fundamental number of poles corresponding thereto and, for at least said first number of poles, a harmonic number of poles, said armature winding having a coil pitch throughout providing small induced voltage therein due to field flux of said harmonic number of poles.

12. A pole-changing, synchronous, three-phase alternating current rotary electric machine having a pole-amplitude modulated, pole-changing, three-phase armature winding having three phase-windings with winding parts selectively connected together for providing first and second alternative numbers of poles and a pole-changing, direct current, salient pole field system including a direct current field winding providing said first and second numbers of poles by reversal of current flow in one part of the field winding relatively to the direction of current flow in another part of the field winding, and including salient poles having widths varying from one to another for both the first and the second numbers of poles, the ratio between any two successive poles for both the first and the second numbers of poles being always less than 2:1, said salient poles having varying widths defining, for both said first and said second numbers of poles, a MMF waveform having a fundamental number of poles corresponding thereto and, for at least said first number of poles, a harmonic number of poles, said armature winding being of such form as to provide said first pole-number, if said three phase-windings were connected in delta, but instead of provision for such delta connection, having nine lead out connections providing connecting termials for series-star and series star-reversed connections for providing said first and second numbers of poles respectively.

13. A pole-changing, synchronous, three-phase alternating current rotary electric machine having a pole-amplitude modulated, pole-changing, three-phase armature winding having three phase-windings with winding parts selectively connected together for providing first and second alternative numbers of poles and a pole-changing, direct current, salient pole field system including a direct current field winding providing said first and second numbers of poles by reversal of current flow in one part of the field winding relatively to the direction of current flow in another part of the field winding, and including salient poles having widths varying from one to another for both the first and the second numbers of poles, the ratio between any two successive poles for both the first and the second numbers of poles being always less than 2:1, said salient poles having varying widths defining, for both said first and said second numbers of poles, a MMF waveform having a fundamental number of poles corresponding thereto and, for at least said first number of poles, a harmonic number of poles, said armature winding being of such form as to provide said first pole-number, if said three phase-windings were connected in delta but, instead of provision for such delta connection, having nine lead out connections providing connecting terminals for parallel-star and parallel-star-reversed connections for providing said first and second numbers of poles respectively.

References Cited
UNITED STATES PATENTS 3,049,653  8/1962  Rawcliffe _____ 318—173
3,175,141  3/1965  Rawcliffe _____ 318—173

ORIS L. RADER, *Primary Examiner.*

GENE RUBINSON, *Assistant Examiner.*